US006722211B1

United States Patent
Ciobanu et al.

(10) Patent No.: US 6,722,211 B1
(45) Date of Patent: Apr. 20, 2004

(54) MULTI-STAGE VARIABLE ORIFICE FLOW OBSTRUCTION SENSOR

(75) Inventors: Calin I. Ciobanu, Brea, CA (US); Adrian D. De Silva, Riverside, CA (US)

(73) Assignee: Viasys Healthcare, Critical Care Division, Yorba Linda, CA (US)

( * ) Notice: Subject to any disclaimer, the term of this patent is extended or adjusted under 35 U.S.C. 154(b) by 0 days.

(21) Appl. No.: 10/619,873

(22) Filed: Jul. 15, 2003

Related U.S. Application Data

(63) Continuation of application No. 09/997,432, filed on Nov. 29, 2001, now abandoned.

(51) Int. Cl.[7] .................................................. G01F 1/37
(52) U.S. Cl. .................................................. 73/861.52
(58) Field of Search ...................... 73/861.52, 861.42, 73/861.53

(56) References Cited

U.S. PATENT DOCUMENTS

| | | | |
|---|---|---|---|
| 4,083,245 A | 4/1978 | Osborne | |
| 4,271,701 A | 6/1981 | Dempster | |
| 4,302,640 A | 11/1981 | Vicenzi | |
| 4,989,456 A | 2/1991 | Stupecky | |
| 4,993,269 A | 2/1991 | Guillaume | |
| 5,197,895 A | 3/1993 | Stupecky | |
| 5,263,369 A | 11/1993 | Cutler | |
| 5,868,133 A | 2/1999 | DeVries | |
| 5,970,801 A | 10/1999 | Ciobanu | |

Primary Examiner—Edward Lefkowitz
Assistant Examiner—Corey D. Mack
(74) Attorney, Agent, or Firm—Stetina Brunda Garred & Brucker

(57) ABSTRACT

There is provided a multi-stage variable orifice flow obstruction sensor for measuring a fluid flow. The sensor comprises a body member having an aperture therethrough. Moreover, a cover member is engaged to the body member and is disposed within the aperture. The cover member is adapted to transition between open and closed positions with respect to the aperture. Additionally, a flow-limiting obstruction member is engaged to the body member and is disposed within the aperture adjacent the cover member. The flow-limiting member is configured to apply a generally opposing force to the cover member when the cover member extends to the open position and contacts the flow-limiting member. By doing so, a pressure differential of the fluid may be sensed such that the fluid flow can be measured therefrom.

26 Claims, 3 Drawing Sheets

MULTI-STAGE VARIABLE ORIFICE FLOW OBSTRUCTION SENSOR

RELATED APPLICATIONS

The present application is a continuation of U.S. application Ser. No. 09/997,432 entitled MULTI-STAGE VARIABLE ORIFICE FLOW OBSTRUCTION SENSOR filed Nov. 29, 2001 now abandoned.

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to obstruction assemblies for measuring fluid flow, and more particularly to an improved multi-stage variable orifice flow obstruction sensor having a resilient flow-limiting obstruction member and fixed flow orifice adapted to accommodate a wide range of fluid flow such that sufficient pressure differentials are developed thereacross at low, normal and high flow conditions to accurately measure such fluid flow therefrom.

The use of obstruction assemblies to measure fluid flows is well known. Generally, fluid is a term which includes both liquids and gases. Flow is defined as the volume of fluid crossing a given point in a certain amount of time. In this regard, fluid flow is typically stated in units such as gallons and/or liters per minute.

It is important to accurately measure fluid flow in certain applications. One such application is when mechanical ventilators are implemented on respiratory patients. As commonly known in that field, proper ventilation may only be provided to these patients based upon accurately measuring the inspiratory and exhalation air flow of the patient.

One common prior art device used specifically for this intended purpose is a fixed orifice flow obstructor. The fixed orifice flow obstructor typically comprises a rigid plate with an aperture or orifice passing through it. This flow obstructor is placed within an enclosed conduit (e.g., pipe, hose, etc.) such that the fluid flowing therethrough can be measured. The diameter of the orifice is smaller than the inside diameter of the pipe.

According to fundamental physical properties, the pressure of the fluid flowing through the flow obstructor is always less than the pressure of the fluid flowing through the larger diameter pipe upstream from the flow obstructor. The difference between these two fluid pressures is defined as a pressure differential. The value associated with the pressure differential is indicative of the fluid flow, that is, a large flow produces a large pressure differential whereas a small flow produces a small pressure differential. Thus, due to this distinct relationship formed between them, the fluid flow may be measured based on obtaining the pressure differential. However, such fixed orifice flow sensor devices are limited to certain flow ranges and fail to provide adequate pressure differential signals over a broad range of flow rates.

More recently, variable orifice flow obstruction devices have been introduced which attempt to provide sufficient pressure differential over a broader range of flow rates. Examples of such flow obstruction devices are shown in U.S. Pat. Nos. 4,993,269 (issued to Guillaume et al.) assigned to the subject assignee and 4,083,245 (issued to Osborn), the disclosures of which are expressly incorporated herein by reference. Put generally, variable orifice flow obstruction devices utilize a hingably connected cut-out flapper that bends open with increased fluid flow so as to increase the effective flow area. Though such currently known and available flow obstructors achieve their primary objective of measuring fluid flows, they all possess certain deficiencies which detract from their overall utility.

As illustrated in FIG. 9, perhaps the greatest deficiency of the prior art flow obstructors is the inability to accommodate both high and low fluid flows such that sufficient pressure differentials can be developed to measure the fluid flows therefrom. In other words, the prior art flow obstructors fail to provide sufficient resistance to high fluid flow rates or provide to change of resistance to low flow rates. Due to such deficiency, the required pressure differentials cannot be obtained throughout broad ranges of flow rates which lead to the further failure of providing accurate, or even estimate, fluid flow measurements (as shown in FIG. 9). Consequently, the range of fluid flows which these prior art flow obstructors can effectively partake in measuring the flows is substantially small.

In view of the above-described shortcomings of prior art flow obstructors, there exists a need in the art for a flow obstructor sensor which can develop pressure differentials throughout a broad range of fluid flows. More specifically, there exists a need for a variable orifice flow sensor capable of accommodating both high and low fluid flow such that sufficient pressure differentials are created to accurately measure fluid flow thereacross.

BRIEF SUMMARY OF THE INVENTION

The present invention specifically addresses and alleviates the above-referenced deficiencies associated with the use of flow obstructors of the prior art. More particularly, the present invention comprises an improved multi-stage variable orifice flow obstruction sensor that can develop suitable pressure differentials throughout a wide range of fluid flow rates. This specific obstruction sensor is designed to effectively accommodate both high and low fluid flow so that sufficient pressure differentials can be created. Such pressure differentials may then be sensed and correlated via conventional pressure transducers as routinely utilized in the art to accurately measure fluid flow.

In accordance with a preferred embodiment of the present invention, the obstruction sensor comprises a flow-limiting obstruction member which is preferably fabricated from a resilient metallic material. The flow-limiting member is engaged within an aperture defined through the obstruction sensor. Preferably, this flow-limiting member forms a constant substantial parallel relationship with respect to the aperture when uninfluenced by a neighboring cover member and/or fluid flow. However, due to its manner of engagement with the obstruction sensor's aperture and its resilient make-up, it should be noted that the flow-limiting member may be urged and/or bent/flexed along the direction of the fluid flow when influenced by the cover member and/or fluid flow.

In the preferred embodiment of the present invention, the obstruction sensor further comprises an anterior member which is preferably made from a substantially rigid metallic material. This anterior member is engaged to the obstruction sensor in a manner as to position the cover member between the anterior member and the flow-limiting member. The prescribed anterior member comprises an upper anterior member portion which protrudes into and partially blocks the obstruction sensor's aperture. In this respect, the lower edge of the upper anterior member portion and the cover member collectively form at least one fixed flow orifice, preferably two.

In operation, the obstruction sensor of the present invention is adapted to accommodate a wide range of fluid flow and provide a sufficient pressure differential thereacross to accurately measure a broad range of fluid flow. More specifically, when the obstruction sensor is confronted by a low fluid flow possessing a velocity or rate that is inadequate to move the cover member, its fixed flow orifice(s). allow such fluid to flow therethrough (best shown in FIG. 8). Furthermore, when it is alternatively, confronted by normal/intermediate fluid flow having velocities or rates that are capable of extending, i.e., flexing or bending, the cover member along the direction of the flow (and hence towards the flow-limiting member), the obstruction sensor allows the fluid to flow through its variable sized orifice or aperture which is now exposed due to the extension of the cover member (best shown in FIGS. 4 and 5).

Moreover, when confronting very high fluid flow with rate that can fully extend the cover member to a generally parallel axis along the flow direction, the flow-limiting member may support and mitigate the cover member's extension by applying a generally opposing force thereagainst (best shown in FIGS. 6 and 7). In this regard, the present obstruction sensor creates required pressure differential across the obstruction at broad rate ranges of the fluid flow so that accurate flow determinations can be made using conventional pressure transducers through which such pressure differentials may then be correlated to measurements of fluid flow.

BRIEF DESCRIPTION OF THE DRAWINGS

These as well as other features of the present invention will become more apparent upon reference to the drawings wherein.

DETAILED DESCRIPTION OF THE INVENTION

Figure 1:
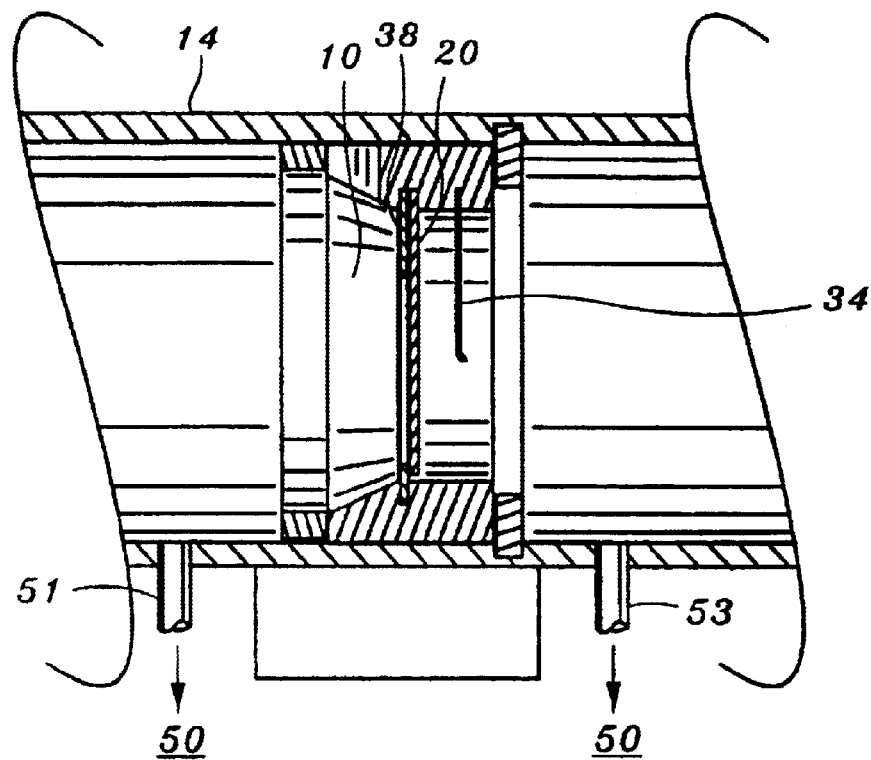
FIG. 1 is a side view of a multi-stage variable orifice flow obstruction sensor utilized for measuring fluid flow constructed in accordance with a preferred embodiment of the present invention.

Referring now to the drawings wherein the showings are for purposes of illustrating preferred embodiments of the present invention only, and not for purposes of limiting the same, FIG. 1 is a side view illustrating a multi-stage variable orifice flow obstruction sensor 10 constructed in accordance with a preferred embodiment of the present invention. As indicated above, the obstruction sensor 10 can develop sufficient pressure differentials throughout a wide range of fluid flow rates. As will be discussed below, these pressure differentials may then be sensed and correlated to via conventional pressure transducers to accurately measure fluid flow. Additionally, those of ordinary skill in the art will recognize that the obstruction sensor 10 may be formed to have a variety of shapes, configurations, geometries and sizes other than for that shown in the provided figures.

Figures 2, 3:
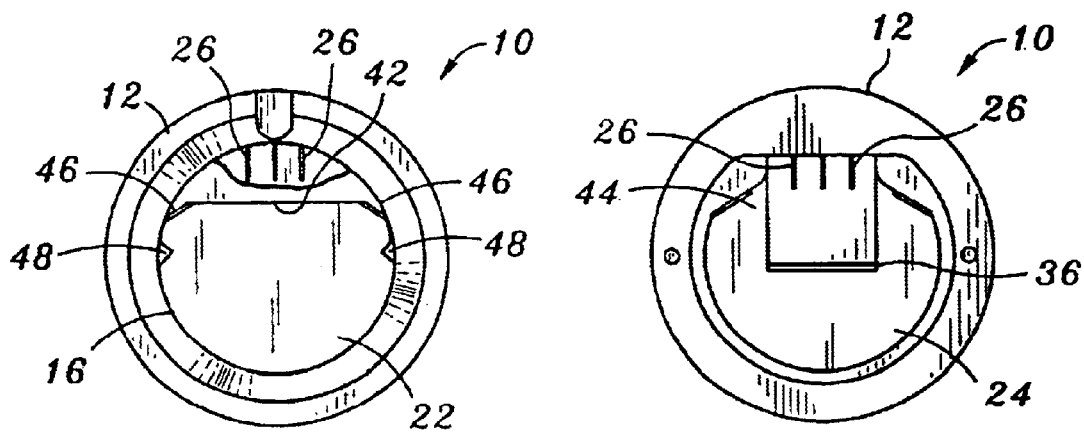
FIG. 2 is a front view of the obstruction sensor of FIG. 1 and illustrating its cover member which, is positioned behind its anterior member.
FIG. 3 is an end view of the obstruction sensor of FIG. 1 and illustrating its flow-limiting obstruction member which is positioned behind its cover member.

Referring more particularly to FIGS. 1–3, the obstruction sensor 10 comprises a body member 12. Although the body member 12 is preferably shaped in a cylindrical configuration as shown in those figures, such depiction is exemplary in nature and should not be limited thereto. Moreover, the body member is further preferably fabricated from metal but even this description is not mandatory as it can be formed from any substantially rigid material. The body member 12 should be receivable within an enclosed housing 14 (e.g., pipe, hose, and the like), preferably concentrically, so that it is subjected to the fluid flowing therewithin.

The body member 12 has an inner wall 16 which defines an aperture 18 extending through it. There is provided a cover member 20 that is engaged to the body member 12 and disposed within the aperture 18 (as shown in FIG. 2). The cover member 20 has a front cover member surface 22 and a back cover member surface 24. Although the manner of engagement between them is not restricted, the cover member 20 is preferably and constantly biased in substantial alignment within the aperture 18 so that the aperture 18 is not exposed. In the preferred embodiment, the cover member 20 is fabricated from a resilient metallic material.

Due to the cover member's 20 manner of engagement with the body member's aperture 18 and its resilient make-up, the cover member 20 may be caused to extend and/or bent/flexed along the direction of the flow when its front cover member surface 22 is impacted by a fluid flow possessing adequate velocity to do so. To facilitate such extension and/or bending, the cover member 20 comprises a plurality of slits 26, preferably vertical ones, which are sized and configured to provide flexibility thereat. In this respect, the cover member 20 can transition between an open position 28 and a closed position 30 with respect to the aperture 18 so as to form multiple flow channels 32 thereby.

There is also provided a flow-limiting obstruction member 34 which is preferably fabricated from a resilient metallic material. This flow-limiting member 34 is engaged to the body member 12 and disposed within the aperture 18 adjacent the cover member 20. Similar to the cover member 20, the flow-limiting member 34 is preferably and constantly biased to form a substantial parallel relationship relative to the cover member 20. The flow-limiting member 34 may be urged and/or bent/flexed along the direction of the fluid flow when influenced by the cover member 20 and/or fluid flow. Like the cover member 20, the flow-limiting member 34 also includes slits 26, preferably vertical ones, to facilitate the accomplishment of this purpose.

Further, the flow-limiting member 34 defines a lower flow-limiting member portion 36. Both the cover and flow-limiting members 20, 34 are engaged to the inner wall 16 of the body member 12 in a spaced apart relation to each other.

The present obstruction sensor 10 further comprises an anterior member 38 which is preferably formed from a substantially rigid metallic material. This anterior member 38 is engaged to the body member 12 in a manner as to position the cover member 20 between the anterior member 38 and the flow-limiting member 34. The anterior member 38 has an upper anterior member portion 40 which protrudes into and partially blocks the aperture 18 of the body member 12. The upper anterior member portion. 40 defines a generally linear lower edge 42, whereas the cover member 20 defines an upper cover member portion 44 which strategically converges thereat. As such, the lower edge 42 and the upper cover member portion 44 collectively form at least one fixed flow orifice 46. In the preferred embodiment, there are two fixed flow orifices 46. However, one of ordinary skill in the art will recognize that the anterior member 38 and cover member 20 may be formed as a. unitary structure in which the cover member 20 may move relative to the anterior member 38.

Moreover, the anterior member 38 comprises at least one protrusion 48. This protrusion 48 is adapted to slightly extend into the aperture 18 of the body member 12, and positioned proximately adjacent the front cover member surface 22 so as to ensure that the cover member 20 extends: only towards the flow-limiting member 34. By doing so, it ensures that the movement of the cover member 20 corresponds with the direction of the fluid flow.

Figure 4:
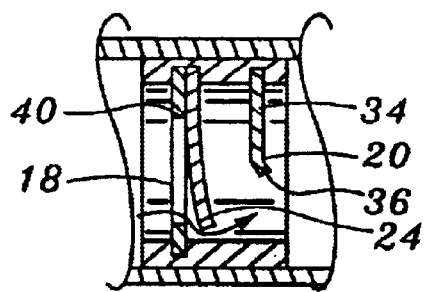
FIGS. 4 and 5 are cross-sectional views of the obstruction sensor of FIG. 1 and illustrating the extension of its cover member towards its flow-limiting member caused by the impact of the fluid flow.
Figure 5:
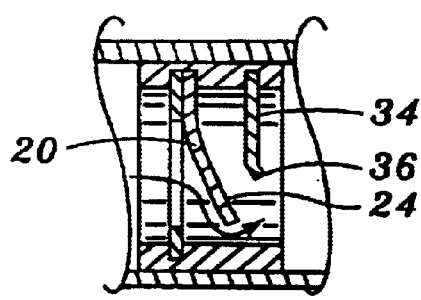
Figure 8:
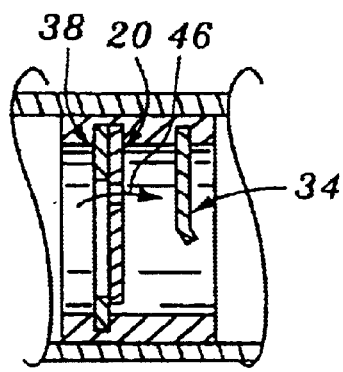
FIG. 8 is a cross-sectional view of the obstruction sensor of FIG. 1 and illustrating its fixed flow orifice(s) which allow low fluid flow to pass therethrough.

In operation, the obstruction sensor 10 of the present invention is adapted to accommodate a wide range of fluid flow and provide a sufficient pressure differential thereacross to accurately measure a broad range of fluid flow. In particular, and as illustrated in FIG. 8, when confronting a low fluid flow possessing a velocity that is inadequate to move the cover member 20, the at least one fixed orifice 46 allows such fluid to flow therethrough. As shown in FIGS. 4 and 5, when the present obstruction sensor 10 is alternatively confronted by normal/intermediate fluid flow having velocities that are capable of extending (i.e., flexing or bending) the cover member 20 along the direction of the flow (and hence towards the flow-limiting member), it allows the fluid to flow through its variable sized orifice or aperture 18 which is now exposed due to the extension of the cover member 20.

Figure 6:
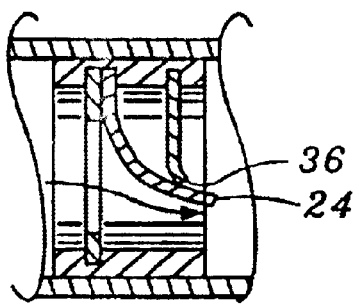
FIGS. 6 and 7 are cross-sectional views of the obstruction sensor of FIGS. 4 and 5 and illustrating its flow-limiting member mitigating the extension of its cover member during occurrences of high fluid flow.
Figure 7:
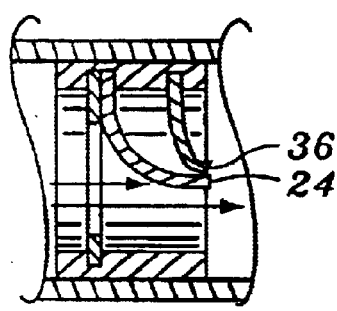

Referring now to FIGS. 6 and 7, when the present obstruction sensor 10 is confronted by very high fluid flow reaching a threshold velocity that can fully extend the cover member 20 to a generally parallel axis along the flow direction, the flow-limiting obstruction member 34 may support and mitigate its extension. Specifically, the flow-limiting member 34 applies a generally opposing force against the cover member 20 when the cover member 20 extends to the open position 28 and makes contact therewith. More specifically, the back cover member surface 24 contacts against the lower flow-limiting member portion 36. Upon this occurrence, the flow-limiting member 34 is urged toward the cover member 20 so as to mitigate the extension of the cover member 20 caused by the fluid flow.

Figure 9:
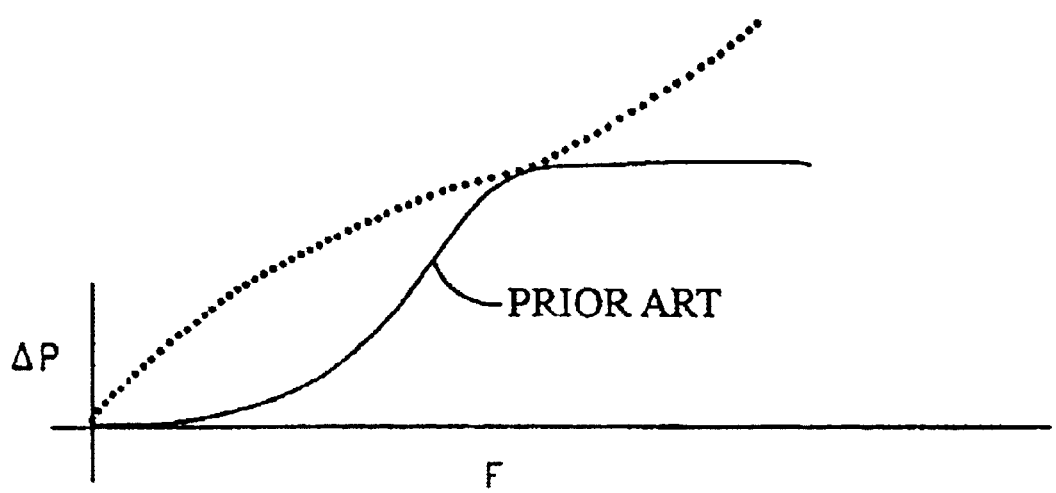
FIG. 9 is a graph comparing the pressure differentials yielded by the present obstruction sensor and the prior art flow obstructors at various stages of fluid flow.

As demonstrated above, and as illustrated in FIG. 9, the present obstruction sensor 10 creates required pressure differential across the obstruction at broad rate ranges of the fluid flow so that accurate flow determinations can be made using conventional pressure transducers. As the fluid flow is communicated to a pressure differential transducer 50 via upstream and downstream pressure ports 51, 53, this transducer 50 can generate electrical signals corresponding to the pressure differential. These signals, in turn, may be transmitted to a mechanism which correlates the signals to the fluid flow such as the microprocessor 52. Of course, the obstruction sensor 10 may be calibrated with the pressure differential transducer 50 (via the use of a chip) to eliminate errors due to non-linearity at its low dynamic range.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A multi-stage variable orifice flow obstruction sensor for measuring a fluid flow in an enclosed housing, the sensor comprising:
    a body member receivable within the enclosed housing, the body member defining an aperture therethrough;
    a cover member engaged to the body member and disposed within the aperture, the cover member being movable between open and closed positions with respect to the aperture;
    a flow-limiting obstruction member engaged to the body member and disposed within the aperture adjacent the cover member, the flow-limiting member being sized and configured to apply a generally opposing force to the cover member when the cover member extends to the open position and contacts the flow-limiting member, the flow-limiting member being bendable in response to movement of the cover member; and
    wherein a pressure differential of the fluid is sensed to measure the fluid flow therefrom.

2. The sensor of claim 1 wherein the body member is concentrically receivable within the enclosed housing.

3. The sensor of claim 2 wherein the body member is cylindrically configured.

4. The sensor of claim 2 wherein the enclosed housing is a pipe.

5. The sensor of claim 1 wherein the body member has an inner wall defining the aperture, the cover member and the flow-limiting member being engaged to the inner wall in a spaced apart and parallel relation to each other when the cover member is biased in the closed position.

6. The sensor of claim 1 wherein the cover member is biased in the closed position and has a front cover member surface, the cover member being extendable towards the flow-limiting member when the fluid impacts the front cover member surface and flow through the aperture.

7. The sensor of claim 6 wherein the cover member has a back cover member surface, the back cover member surface contacting the flow-limiting member when the front cover member surface is impacted by the fluid flow reaching a threshold velocity.

8. The sensor of claim 7 wherein the flow-limiting member has a lower flow-limiting member portion, the lower flow-limiting member portion being contactable by the back cover member surface when the fluid flow reaches the threshold velocity.

9. The sensor of claim 7 wherein the flow-limiting member is urged toward the cover member when the back cover member surface contacts therewith so as to mitigate the extension of the cover member caused by the fluid flow.

10. The sensor of claim 1 wherein the cover member and the flow-limiting member are each fabricated from a resilient material.

11. The sensor of claim 1 wherein the body member, the cover member and the flow-limiting member are each fabricated from a metallic material.

12. The sensor of claim 1 wherein the cover member and the flow-limiting member each comprises a plurality of slits for providing flexibility thereat.

13. The sensor of claim 1 further comprising an anterior member engaged to the body member at one side of the cover member to position the cover member between the anterior member and the flow-limiting member, the anterior member having an upper anterior member portion partially blocking the aperture.

14. The sensor of claim 13 wherein the upper anterior member portion and the cover member collectively form at least one fixed flow orifice, the at least one flow orifice being sized and configured to allow the fluid to flow therethrough when a velocity of the fluid is not sufficient to extend the cover member towards the flow-limiting member.

15. The sensor of claim 13 wherein the anterior member comprises at least one protrusion extending to the aperture so as to ensure that the cover member extends only towards the flow-limiting member.

16. The sensor of claim 1 further comprising a pressure differential transducer connected to the enclosed housing, the pressure differential transducer being operative to generate an electrical signal corresponding to the pressure differential.

17. The sensor of claim 16 further comprising a microprocessor for correlating the electrical signal to the fluid flow.

18. A multi-stage variable orifice flow obstruction sensor for measuring a fluid flow in an enclosed housing, the sensor comprising:

a body member concentrically receivable within the enclosed housing, the body member defining an aperture therethrough;

a cover member engaged to the body member and disposed within the aperture, the cover member being movable between open and closed positions with respect to the aperture;

an anterior member engaged to the body member adjacent to only one side of the cover member, the anterior member having an upper anterior member portion sized and configured to partially block the aperture, the upper anterior member portion and the cover member collectively forming at least one fixed flow orifice for allowing the fluid with a non-zero flow rate to flow therethrough when the fluid flow fails to extend the cover member towards the open position; and wherein a pressure differential of the fluid is sensed to measure the fluid flow therefrom.

19. The sensor of claim 18 wherein the enclosed housing is a pipe.

20. The sensor of claim 18 wherein the anterior member comprises at least one protrusion extending to the aperture so as to ensure that the movement of the cover member corresponds only with the fluid flow.

21. The sensor of claim 18 further comprising a flow-limiting obstruction member engaged to the body member in a manner as to position the cover member between the flow-limiting member and the anterior member, the flow-limiting member being disposed within the aperture, the flow-limiting member being sized and configured to mitigate the movement of the cover member when the cover member extends to the open position and contacts the flow-limiting member.

22. The sensor of claim 21 wherein the cover member contacts the flow-limiting member when impacted by the fluid flow reaching a threshold velocity.

23. The sensor of claim 21 wherein the cover member and the flow-limiting member are each fabricated from a resilient material.

24. The sensor of claim 18 further comprising a pressure differential transducer connected to the enclosed housing, the pressure differential transducer being operative to generate an electrical signal corresponding toe the pressure differential.

25. The sensor of claim 24 further comprising a microprocessor for correlating the electrical signal to the fluid flow.

26. A multi-stage variable flow obstruction sensor for measuring a fluid flow in an enclosed housing, the sensor comprising:

a body member receivable within the enclosed housing, the body member defining an aperture therethrough;

a cover member engaged to the body member, the cover member having a front surface and a back surface and being moveable between closed and open positions with respect to the aperture;

an anterior member engaged to the body member and adjacent to the front surface of the cover member; and a flow-limiting member engaged to the body member and adjacent to the back surface of the cover member;

wherein the anterior member and the cover member collectively defining at least one fixed flow orifice such that before the velocity of the fluid flow exceeds a first non-zero velocity, the cover member is biased in the closed position with respect to the aperture;

the flow-limiting member being so disposed and configured that when the fluid flow exceeds the first non-zero velocity, the cover member starts bending towards the flow-limiting member until being in contact therewith, and when the fluid flow exceeds a second non-zero velocity, both the cover member and the flow-limiting member bend to an open position substantially parallel to the fluid flow, wherein the second non-zero velocity is faster than the first non-zero velocity.

* * * * *